United States Patent
Hosny et al.

(10) Patent No.: US 9,754,294 B2
(45) Date of Patent: Sep. 5, 2017

(54) FACILITATING CHARITABLE DONATIONS ON A BANKING SYSTEM

(71) Applicant: MasterCard International Incorporated, Purchase, NY (US)

(72) Inventors: Ahmed Hosny, Dublin (IE); Peter J. Groarke, Dublin (IE)

(73) Assignee: MasterCard International Incorporated, Purchase, NY (US)

( * ) Notice: Subject to any disclaimer, the term of this patent is extended or adjusted under 35 U.S.C. 154(b) by 349 days.

(21) Appl. No.: 14/093,804

(22) Filed: Dec. 2, 2013

(65) Prior Publication Data
US 2015/0154666 A1 Jun. 4, 2015

(51) Int. Cl.
G06Q 30/06 (2012.01)
G06Q 30/02 (2012.01)
G06Q 30/08 (2012.01)

(52) U.S. Cl.
CPC ................. G06Q 30/0279 (2013.01)

(58) Field of Classification Search
CPC ................. G06Q 30/06; G06Q 30/08
USPC .................................. 705/26.1, 27.1
See application file for complete search history.

(56) References Cited

U.S. PATENT DOCUMENTS

2014/0304186 A1* 10/2014 Brown .................... 705/329
2015/0006366 A1* 1/2015 Sobhani et al. ............ 705/39

* cited by examiner

Primary Examiner — James Zurita
(74) Attorney, Agent, or Firm — Buckley, Maschoff & Talwalkar LLC

(57) ABSTRACT

Methods, apparatus and systems for automatically calculating charitable donations for donors and for distributing the charitable donations in accordance with the donors' wishes to approved and/or registered recipients, such as approved charitable organizations. In some embodiments, the method includes receiving contributor information, recipient information and donation data during a predetermined period of time, and then aggregating the donations from a plurality of contributors into a plurality of recipient contribution amounts. The process also includes distributing, at the end of the predetermined period of time, the recipient contribution amounts to recipient financial institutions based on the contributor information, the recipient information and the donation data.

14 Claims, 6 Drawing Sheets

FACILITATING CHARITABLE DONATIONS ON A BANKING SYSTEM

FIELD OF THE INVENTION

This application generally relates to calculating charitable donations and distributing the proceeds on a banking system. More specifically, the invention relates to methods, apparatus and systems for calculating charitable donations for contributors and for distributing the charitable donations to approved recipients, such as approved charitable organizations.

BACKGROUND OF THE INVENTION

There exist today several types of religious obligations relating to alms-giving or charitable giving by persons who subscribe to various religious faiths. For example, Zakat is an alms-giving practice of the Islamic faith based on accumulated wealth. In particular, Zakat requires Muslims who are able to do so to donate a percentage of their accumulated wealth to ease economic hardship for others and to eliminate inequality. A similar religious charitable tradition of "tithes" exists in the Christian and Jewish religious faiths.

Global Zakat annual contributions have been estimated to be between about $200 billion dollars and about $1 trillion dollars per year, and the low end of this estimate is estimated to be about fifteen (15) times more than all of the global humanitarian aid contributions made by countries in 2011. In order to conform to the Zakat obligation, a Muslim may typically have to give a certain percentage (for example, 2.5%) of the lowest daily closing balance on his main bank account over the course of a year to one or more nominated charities. In practice, this monetary amount can be onerous to calculate and difficult to disperse.

Accordingly, the inventors recognized that there is a need for a system for calculating and dispersing Zakat obligations (and for use in calculating and dispersing charitable sums based on other types of alms giving practices) that would be beneficial to both Contributors and Recipients.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

In general, and for the purpose of introducing concepts of novel embodiments described herein, provided are methods, apparatus and systems for automatically calculating charitable donations for donors or contributors and for distributing the charitable donations in accordance with contributors' or donors' wishes to approved and/or registered recipients, such as approved charitable organizations. The methods, apparatus and systems disclosed herein benefit contributors because they simplify the calculations required to obtain an amount of donations required to satisfy, for example, a religious obligation. In addition, the methods, apparatus and systems described herein benefit recipients such as charitable organizations by facilitating their selection by donors, and by streamlining the donation process resulting in cost efficiencies that maximize and/or increase the sums received by the charitable organizations or recipients. In particular, in some embodiments the fees associated with charitable donation calculations, currency translations, and distributions of the donated sums may be aggregated and/or minimized, which results in maximizing the monetary amounts provided to the recipients.

Figure 1:
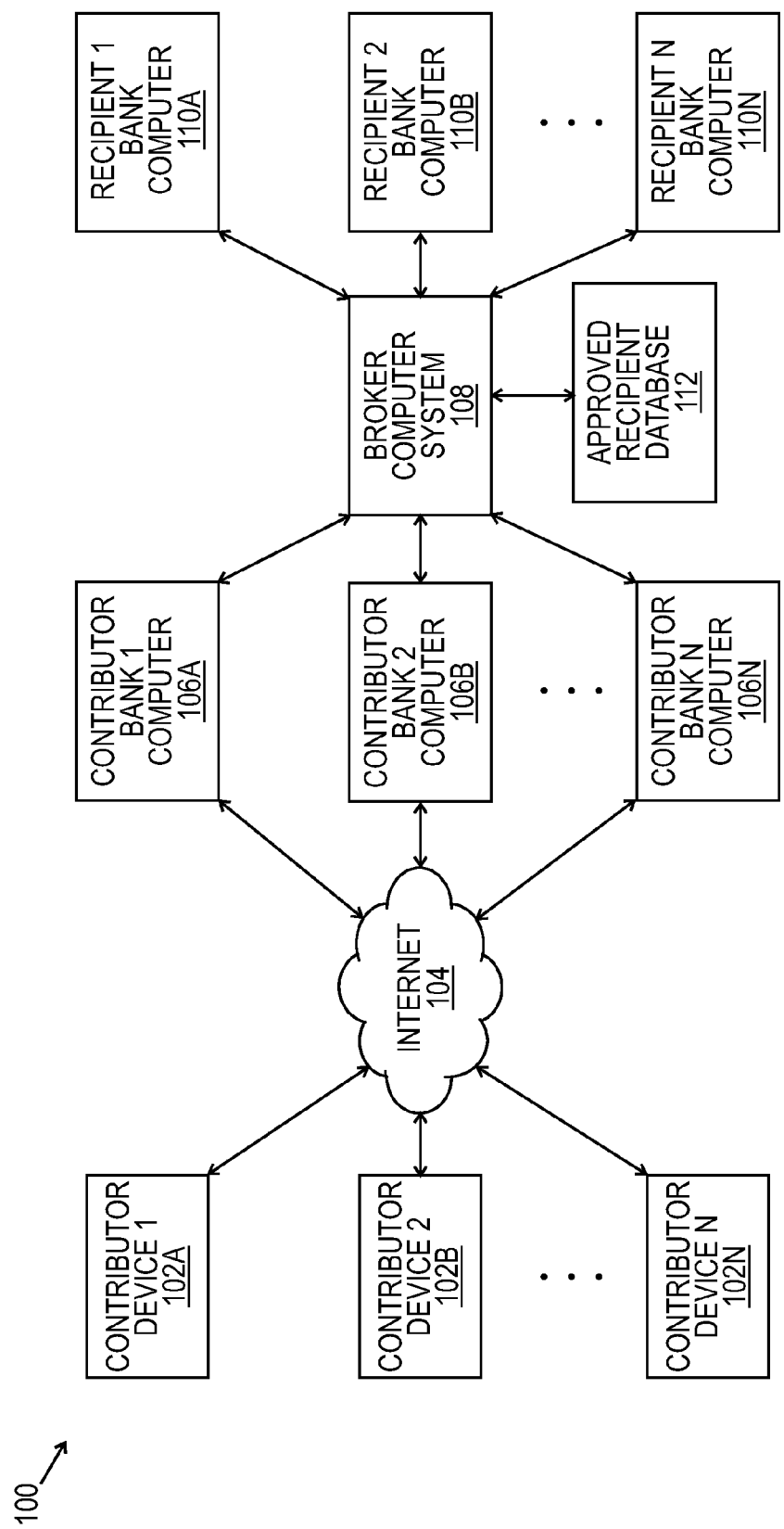
FIG. 1 is a block diagram illustrating a charitable contribution banking system according to an embodiment of the invention.

FIG. 1 is a block diagram illustrating a charitable contribution system 100 according to an embodiment. In some embodiments, people or persons (bank customers) who wish to donate money to charities (also known as "contributors" or "donators") operate contributor devices 102A, 102B to 102N to communicate via the Internet 104 with their financial institutions, such as Contributor Bank computers 106A, 106B to 106N. The contributor devices may be, for example, laptop computers, smart phones, personal digital assistants (PDAs), tablet computers (such as the iPad™), desktop computers, and/or any other electronic device having communications capability. In some implementations, a contributor device is configured for connection to one or more networks (such as the Internet 104) via a wired or wireless connection, and such connections may be made over a secure line or secure network.

Referring again to FIG. 1, a Broker Computer system 108 is configured for communications with the contributor bank computers 106A-106N and with recipient bank computers 110A to 110N. Although direct connections are shown, in some embodiments the Broker Computer system 108 may be configured to communicate with the various financial institutions via secured or unsecured networks (for example, configured to communicate via the Internet 104) in a direct or indirect manner, and such communications may occur in a wired or wireless manner. In addition, the contributor bank computers 106A-106N and the recipient bank computers 110A-110N may be in the same or different countries. In some embodiments, the Broker Computer system 108 may be operated by a payment processing organization such as MasterCard International Incorporated, and may be configured to communicate with (and may be responsible for maintaining) an Approved Recipient Database 112.

In some embodiments, the Approved Recipient Database 112 includes a list of registered and/or accredited and/or otherwise approved charities. In an implementation, potential recipients (charitable organizations and the like) must register with the Broker Computer system 108 by providing required information such as the charity name and address, a detailed description of charitable activities, contact details, and at least one currency code of an International Banking Account Number (IBAN) account. Thus, each recipient (charity) is affiliated with and/or has an international account with one or more of the recipient banks 110A-110N. Potential charitable donation recipients (for example, the International Red Crescent), may register with the Broker Computer system 108 by providing required information and then submitting to a screening process. In some implementations, potential recipients are subjected to a robust vetting process that includes confirming the contact information and bank details of the potential recipient organization, ensuring that the recipient is an accredited and/or approved charity, and ensuring that the recipient does not appear on a blacklist or other suspect list provided by any legal entities, such as law enforcement agencies or international anti-terrorist intelligence organizations.

Figure 2:
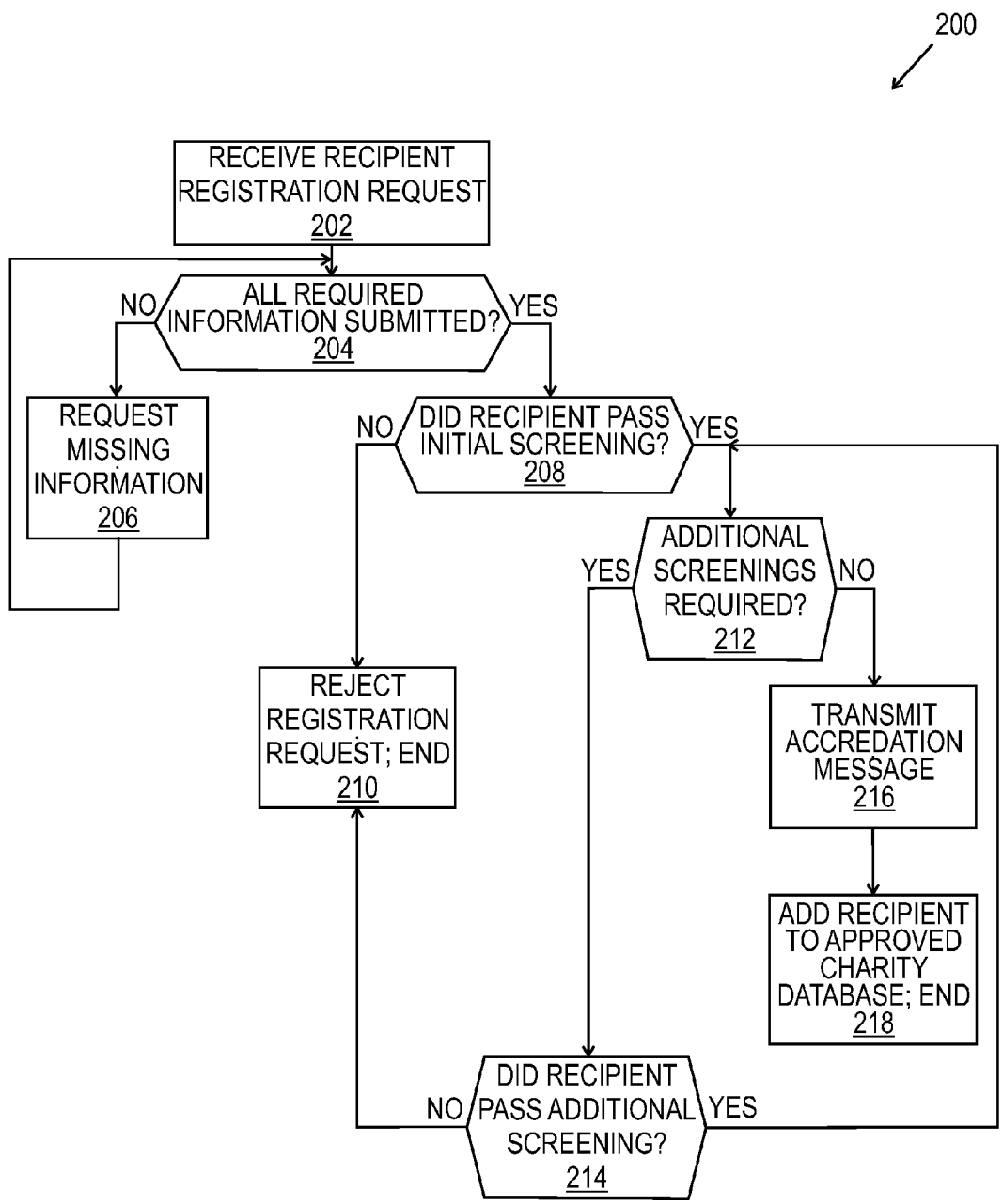
FIG. 2 is a flowchart illustrating an example of a potential recipient screening process according to an embodiment of the invention.

FIG. 2 is a flowchart illustrating an example of a recipient screening process 200 according to an embodiment. In some embodiments, the Broker Computer system 108 receives 202 a registration request from a potential recipient, such as a charitable organization wishing to be added to a list of approved recipients that are eligible to receive charitable donations through one or more recipient banks 110A to 110N. In some embodiments, the potential recipient must fill out an "Recipient Eligibility Application" form that includes basic information such as contact information including the name and address of the charitable organization (which may include a "Doing Business As" name, if different than the official charity name), telephone number, Website and email address(es), a listing of all jurisdictions in which the charity has a physical presence, the name of the chief executive officer (CEO) and at least one contact person and contact details. The potential recipient is also expected to provide a detailed description of charitable activities and/or activities and purpose and/or goals of the charitable organization, at least one currency code of an International Banking Account Number (IBAN) account, and a list (including names and addresses) of all financial institutions that the potential recipient maintains accounts. If the charity supports or funds other organizations, a list of all the names and addresses of such organizations and their purposes and/or goals would also be required. In addition, the potential recipient may be required to provide a detailed accounting of the programs, finances, governance and fund raising practices of the charity.

In some embodiments, in order to be a registered or accredited charity, a potential recipient of charitable donations may also be required to meet standards that are required by third party screening organizations and/or government organizations. For example, the Better Business Bureau (BBB), which operates in the United States of America, follows certain guidelines or requirements to accredit charitable organizations. One or more government entities associated with one or more countries or jurisdictions in which a potential recipient operates and/or resides may require further information in order to permit a recipient to qualify as an approved or eligible recipient for receiving charitable donations. In particular, the BBB defines twenty (20) standards for "Charity Accountability" based on a review of information and materials provided by a charitable organization. (In the United States, organizations that are tax exempt under section 501(c)(3) of the Internal Revenue Code or that conduct charitable solicitations fall within the scope of the BBBs' voluntary Standards for Charity Accountability.)

For example, the entity that maintains the Approved Recipient Database 112 may require a particular charity to provide a completed grant application form and a copy of the charity's organizing documents, such as a constitution, a trust deed, by-laws, or a charter. The organizing documents may be required to provide information regarding what will happen to funds in the event of that charity ceasing to function. Proof of registration as a Not-For-Profit organization and a description of the charitable programs and activities of the organization may also be required. Potential recipients may also provide brochures, an annual review, a sample of fundraising leaflets and/or other pertinent written materials that exemplify the charitable programs. Furthermore, the charity's most recent financial statements together with a description of funding sources may be required, along with a list of the charity's Trustees or Directors and a description explaining how the Trustees or Directors are selected. In addition, detailed or additional information (or explanations) may be required regarding if the potential recipient engages in any activities unrelated to the charity's primary purpose, or if the potential recipient attempts to influence legislation (except as an insubstantial part of the organizations activities), or if the potential participant participates or intervenes in any political campaign for or against any candidate for public office. Such information may be shared with one or more government agencies, if required in one or more jurisdictions.

Referring again to FIG. 2, if in step 204 all the required information has not been submitted by a potential recipient, then a request 206 for the missing information may be transmitted to the potential recipient. For example, in the United States, a potential recipient may be required to provide copies of their latest audited financial statements, IRS Form 990 (a federal tax form), and their annual report along with additional documents (such as those mentioned above, and submission of one or more of such documents may depend upon how certain questions in the recipient registration application are answered). If any such papers are missing, the potential recipient may be invited to provide them by a certain deadline, and if that deadline is missed then that potential recipient's request is withdrawn from further consideration. If the potential recipient does not pass the initial screening process 208 (for any reason), then the potential recipients' registration request is rejected 210, and the process ends. This may occur when, for example, it is found (during a background check) that the potential recipient provided fraudulent or misleading information, or if a determination is made that the potential recipient does not meet stated financial requirements. In some cases, a government and/or law enforcement entity may determine that a potential recipient is affiliated or associated with a terrorist organization resulting in rejection. In addition, a potential recipient will be rejected if it is found to be on a blacklist provided by one or more local or international law enforcement organizations. In some embodiments, when a potential recipient is rejected, then a detailed explanation is provided and the potential recipient accorded a chance to provide additional and/or supplemental information, and/or be invited to file a new registration request.

As mentioned above, some countries and/or jurisdictions may have additional, mandatory standards that potential recipients (such as charities) must conform to in order to be accredited and/or registered. Therefore, in step 212 if additional screening is required, the Broker computer system 108 may perform additional charitable accreditation screening processes which may be associated with one or more countries and/or jurisdictions (for example, to screen potential recipients residing and/or operating in multiple countries). If the potential recipient does not pass the additional screening 214, then the registration is rejected 210 and the process ends. But if the potential recipient passes 214 the additional screening, then another check is made for additional screening 212. If no additional screening is required (thus, the potential recipient has passed all applicable and/or required charity screening processes), the Broker computer system transmits 216 an acceptance and/or accreditation message to the recipient, which means that the potential recipient has been found to be a "valid" or "approved" recipient. The valid recipient is then added 218 to a list of approved and/or available recipients, and information concerning that approved recipient is stored in the Approved Recipient Database 112. However, in some embodiments, before being added to the Approved Recipient Database, an accredited recipient may be required to sign an Agreement promising that none of the received donations will be used, directly or indirectly:

to influence legislation;
  to influence the outcome of any specific election for candidates to public office or to carry on any voter registration drive;
  to induce or encourage violations of law or public policy or to cause any improper private benefit to occur;
  to make any donations to an individual, other than as a part of the charitable activities described in the registration application by the potential recipient; or
  to undertake any activity that is not charitable activity (as described in the registration application by the potential recipient).

In addition, the approved recipient may also be required to promise that it does not employ or deal with, and will not use any donations to aid or support, any entities or individuals that appear on any anti-terrorist watch lists or whom the approved recipient otherwise knows to support terrorism. Moreover, the approved recipient may also be required to promise that it will undertake reasonable steps to continually ensure that donated funds will not ultimately support terrorist organizations, and will not be used for tuition, medical expenses, or other economic benefits to a donor or any member of a donor's family. In some implementations, the approved recipient may also be required to promise that, if it is dissolved or is otherwise unable to use donated funds for the purpose(s) and/or activities described in their bylaws or charter or constitution, then the approved recipient will promptly return any such unexpended donated funds to the entity maintaining the Broker Computer System. Furthermore, the approved recipient may be required to promise that, if any portion of the donated funds is used for any purpose other than those described by the charity in the application papers, then the approved recipient will promptly correct the error. But if such misuse is not promptly corrected, then the Broker Computer System may demand the return of the entirety of the donated funds. The approved recipient may also be required to agree that the laws of the country in which the entity responsible for maintaining the Broker Computer System resides will apply to and/or govern the Agreement regarding receipt and usage of donated funds.

In some implementations, however, a charitable organization that has been approved by a recognized and/or appropriate government organization may be permitted to opt-in to the charitable organization system 100 and be added to the approved recipient database 112. In such a case, the government approved charitable organization may be required to provide proof of government registration as an approved recipient along with payment information. For example, a copy of a charitable organization registration document (such as a certified or otherwise officially authenticated copy of a government issued charitable organization registration document) and a recipient bank account number would be requested, and if provided that charitable organization would not be required to go through a registration process, such as that described above with regard to FIG. 2.

In some embodiments, once potential recipients are added to the Approved Recipient Database, then a list of such approved and/or accredited recipients may be made available to contributors and/or donors, and may receive donations in accordance with the requirements of one or more of Zakat and/or tithing and/or other charitable giving programs.

Referring again to FIG. 1, each of the Recipient Banks 110A-110N may also undergo screening processes that are either voluntary and/or required by one or more countries and/or jurisdictions to qualify to be added to a list of valid recipient banks for the registered or accredited recipients (charities) stored in the Approved Recipient Database 112. Such screening may include confirmation of registration information provided by the recipient bank and each accredited recipient handled by that bank, and may include the involvement of one or more government and/or law enforcement organizations to ensure that, for example, a terrorist organization is not receiving monies by fraudulently opening and utilizing an international bank account that has been registered to a valid charitable organization.

Figure 3:
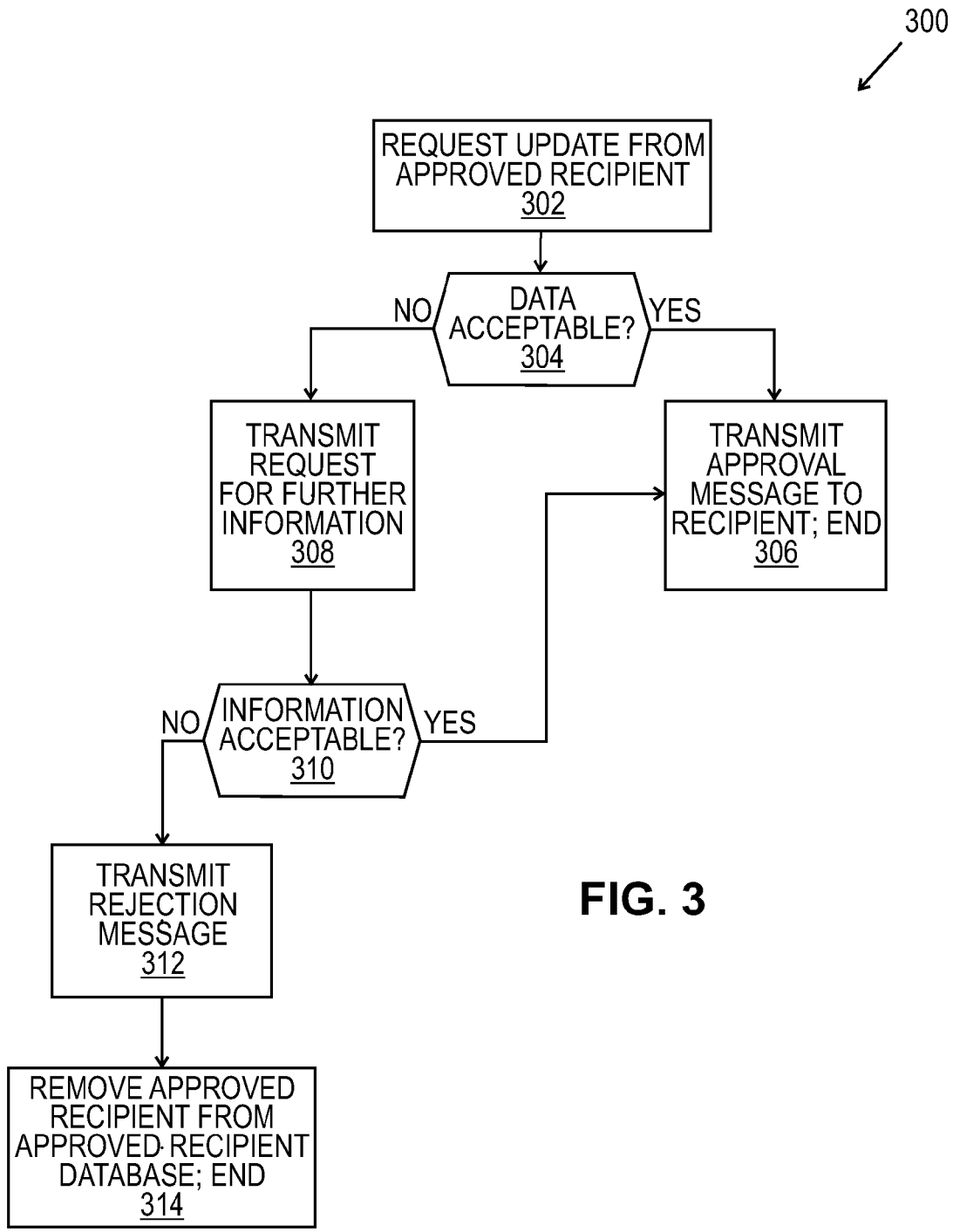
FIG. 3 is a flowchart illustrating an approved recipient re-accreditation process according to an embodiment of the invention.

In addition to vetting the applications of potential recipient charitable organizations, in some embodiments the entity operating the Broker Computer system 108 is responsible for continually and/or periodically monitoring the approved recipients (such as charitable organizations) who have already been accredited or validated to ensure that such recipients are upholding the required standards to remain accredited or validated. Thus, FIG. 3 is a flowchart illustrating a recipient re-accreditation process 300 according to an embodiment. The process begins when the Broker Computer system 108 requests 302 an update of accreditation data from an approved recipient, which may be similar to or identical to the requirements discussed above with regard to potential recipient registration or accreditation. If the data is acceptable 304, for example, after some investigation the accredited recipient's data is found to be accurate and conform to requirements, then the Broker computer system transmits 306 an approval message explaining to the approved recipient that the recipient is in good standing and the process ends. However, if a determination is made that the data is not acceptable in step 304, the Broker computer system transmits 308 a request for further information to the approved recipient, which may include a deadline for responding. If the information received in step 310 is acceptable, then the Broker computer system transmits 306 an approval message to the recipient explaining that the recipient is in good standing and the process ends.

Referring again to FIG. 3, if in step 310 the information received from the recipient is not acceptable (or if the recipient did not respond in a timely manner and thus missed a deadline), then the Broker computer system transmits 312 a rejection message indicating that the recipient failed the re-accreditation process and thus is no longer an approved recipient. A particular valid or approved recipient may become invalid, for example, due to being discredited by a government and/or a law enforcement agency, and/or by virtue of going bankrupt, and/or by failure to keep up their standards regarding their operations, and the like. In some embodiments, the invalidated recipient merely missed a reporting deadline, that recipient may be provided with another chance (with another deadline) to provide missing information. When a formerly approved recipient is invalidated, then the Broker computer system 108 removes 314 that recipient from the list of available recipients and from the approved recipient database. In some embodiments, all scheduled payments to such an invalid recipient are terminated, and that invalidated recipient is replaced with a default recipient for receipt of contributors' donations. In such a case, in some implementations each contributor to the now invalidated recipient is notified of the change and may be permitted to designate an alternate approved recipient. In some implementations, any outstanding payments meant for a discredited and/or invalided recipient are instead transferred or dispersed to a global default list of valid recipients.

Figure 4:
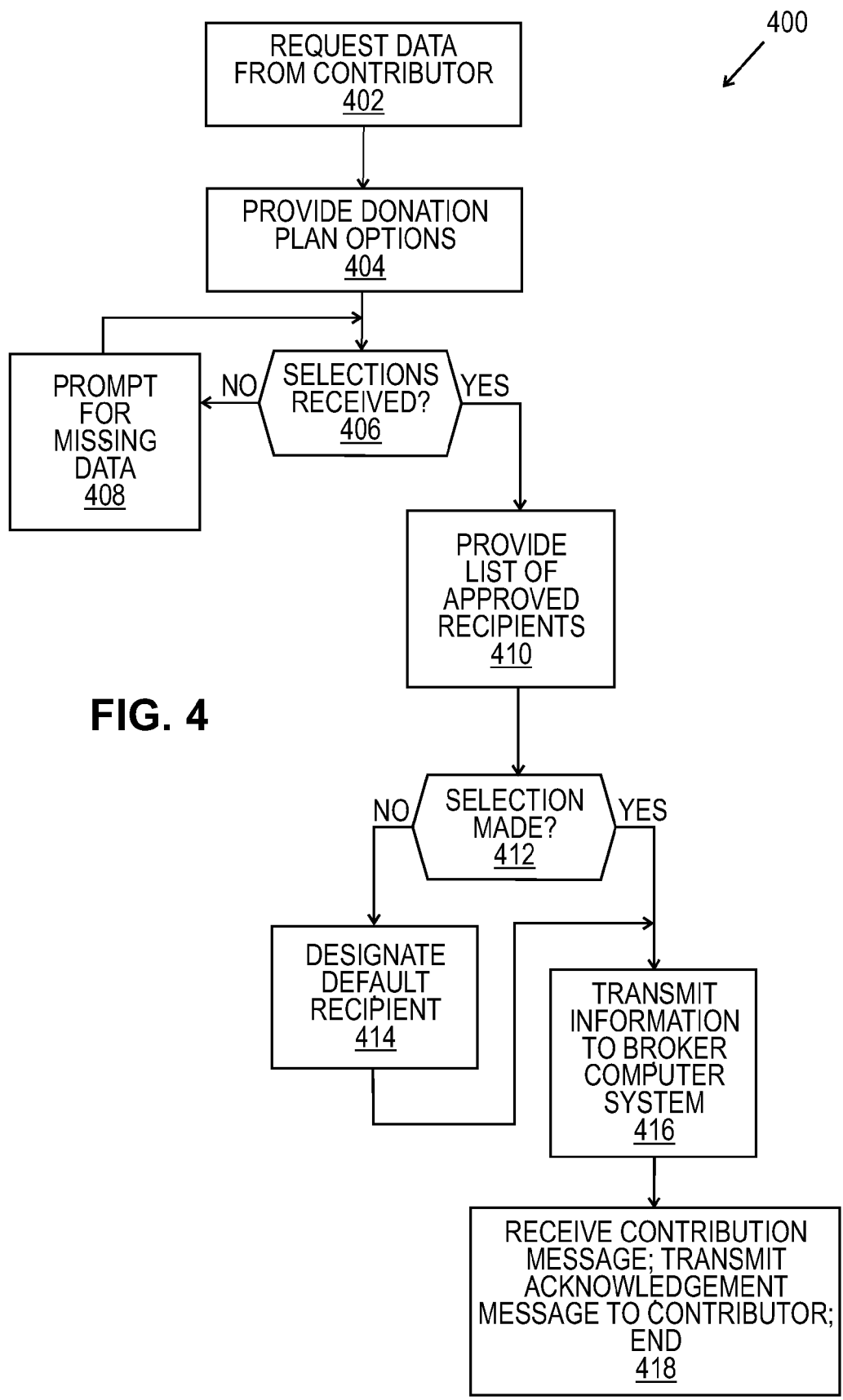
FIG. 4 is a flowchart illustrating a contributor registration process according to an embodiment of the invention.

FIG. 4 is a flowchart illustrating a donor or contributor registration process 400 according to an embodiment. In particular, a person desiring to schedule charitable donations which may or may not be related to a religious obligation, may initially contact his or her financial institution (typically his or her savings bank, designated as a contributor bank in FIG. 1) to register and/or sign-up for a charitable donation plan. The financial institution or contributor bank may provide, for example, a link on their Website to a Web page that allows the banking customer (the donor or contributor) to provide required information and to select a charitable donation plan from a menu of such plans. In some embodiments, the contributor bank or financial institution enters into an agreement with an entity that operates the Broker Computer system 108 (such as a payment processing organization) to obtain software and/or middleware and/or almsgiving support services for handling such charitable donation plans. As mentioned earlier, in some embodiments, the entity that operates the Broker Computer system is a payment processing organization, such as MasterCard International Incorporated.

Thus, in some embodiments, the Contributor Banks 106A to 106N may contract with an entity such as MasterCard International Incorporated (operating the Broker Computer system 108) to obtain alms-giving calculations support (such as donation calculation algorithms), to obtain a list of approved recipients, and to have the Broker Computer system handle the distribution of contributions (funds) specified by donors (banking customers of the Contributor Bank 106A) to approved recipients from one or more donor or contributor bank accounts. The Broker Computer system may also provide currency translation services when required. Therefore, in some embodiments, the Broker computer system receives contributor information, recipient information and donation data from a plurality of contributor FIs during a predetermined period of time, aggregates donations from the contributors into a plurality of recipient contribution amounts based on the recipient information and/or the donation data, and then distributes the recipient contribution amounts to the recipient FIs based on the contributor information, the recipient information and the donation data. Thus, the Broker Computer system operates to receive contributor information, recipient information and donation data and then aggregates all of the donations based on the approved recipient information and/or the donation data, which may be accomplished using a batch process. The batch process may include aggregating or batching donations (payments to a particular approved recipient) with a frequency that may be determined by the entity operating the Broker Computer system. In some implementations, the donations to particular approved recipients may be aggregated on a daily basis (a twenty-four (24) hour period) and then distributed to recipient banks shortly thereafter (sometimes within a time period of a few hours to another day or 24 hours). But other implementations may utilize other frequencies or time frames to aggregate donations for one or more approved recipients, which may depend on, for example, the goals of a particular charitable organization. For example, for approved recipients that provide disaster aid, aggregating may occur on a daily basis (because donations may need to be distributed as soon as possible after a natural disaster), but for those approved recipients who do not provide disaster aid then donations from contributor bank accounts may be aggregated weekly, monthly and/or quarterly, and then distributed. In some embodiments, before distributing donations to recipient bank accounts for a particular charity (based on contributor information, recipient information and donation data provided by a contributor bank), the Broker Computer system performs any required currency conversions or translations. Aggregating donations in this manner minimizes the number of currency transfers and currency conversions which results in minimizing the associated costs (transfer costs and conversion costs) to maximize the benefit to approved recipients.

Thus, in some embodiments the Broker Computer system may maintain a database containing a plurality of almsgiving algorithms that can be accessed by the Contributor Banks 106A-106N for use by donors (bank customers) to calculate donation amounts. The Broker Computer system may also populate and maintain an Approved Recipient database 112 (as explained above) and provide a list of approved recipients to the Contributor Banks for presentation to donors so that each donor can select one or more approved recipients.

Referring again to FIG. 4, a contributor bank receives 402 data from a banking customer including an indication that the customer wishes to make a charitable donation and customer bank account information. In order to provide such information, the banking customer may visit his or her financial institution's website (the website of a Contributor Bank) and enter required data into one or more forms. In some embodiments, the financial institution then provides 404 a menu of charitable donation plan options, which options may be based on or associated with various religious obligations. If a selection is not received within a predetermined time or if incomplete information is received in step 406, a prompt 408 may be transmitted to the banking customer reminding him or her to make a selection. In some cases, the banking customer may be permitted to modify one or more variables associated with a donation plan, which will be explained below. After selection of a donation plan is received, a list of approved recipients is provided 410 for selection by the donor or contributor (the banking customer). If a selection is not made within a predetermined time limit in step 412, then in some implementations a default recipient is designated 414 and the the contributor information and donation data (including the default recipient data) is transmitted 416 to the Broker Computer system 108 for further processing. But if the contributor or donor selects one or more approved recipients within the predetermined time limit in step 412, then the contributor information and selected approved recipient data is transmitted 416 to the Broker Computer system. Next, the Contributor Bank associated with the donor receives 418 a contribution message from the Broker Computer system, which may include details of the scheduling of a transfer of funds from the contributors' bank account to a recipient bank account of an approved recipient chosen by the contributor. The Contributor Bank then transmits an Acknowledgement message to the contributor bank (for forwarding to the donor or banking customer), and the process ends. The Acknowledgement message may include details such as the donation amount, the date that the transfer of funds will occur (or has occurred), and the name of the selected approved recipient.

In some embodiments, a donor or contributor may utilize a mobile device (such as a smartphone, tablet computer, personal digital assistant (PDA), laptop computer, music player, portable gaming device, and the like) or a desktop computer to select a charitable donation giving plan, and to make one or more donations, without interacting with a website of a financial institution. For example, a potential donor may download and store a charitable giving application program into a storage device or memory of a donor's smartphone (or other mobile device) or desktop computer, and then use it to select a donation plan from a plurality of donation plan options. Such a charitable giving application program may also be configured to provide donation amount estimates based on information input by the potential donor, so that the donor can understand how much money would be donated in one or more charitable scenarios. For example, the charitable giving application program may permit a potential donor to input percentage amount data for two or more scenarios associated with one or more bank accounts, and to also choose one or more donation plans. The charitable giving application program then outputs (for example, onto a display screen of a mobile device or desktop computer) estimates of the total amount of money that would be donated within a specified time period for each scenario chosen by the prospective donor. The charitable giving application program may also be configured to provide a list of approved recipients, and to accept designations of one or more of such accredited charitable organizations by the donor. The donor may then be prompted to make a final selection that will be transmitted to his or her financial institution computer system (contributor bank) for processing. In some embodiments, the contributor bank receives and processes the donor's charitable giving request and then transmits a confirmation message to the donor for information purposes. (Such a confirmation message may be transmitted via email, SMS, and/or push notifications to a mobile device or desktop computer, and the method utilized may have been pre-selected by the donor). However, in some implementations, before executing the charitable giving plan (actually transmitting a donation to a recipient bank account), the contributor bank may require the donor (bank customer) to confirm that the information contained in the confirmation message is correct. In some embodiments, the charitable giving application program is configured for direct communications between the donor's mobile device (or desktop computer) and the broker computer system for setting up a charitable giving plan, and then the broker computer system provides necessary data to a contributor bank associated with the donor when donations are to be made. Thus, such a donor device charitable giving application program may be offered for downloading and installing by the donor on his device, for example, by one or more of a contributor bank, a recipient bank, the broker computer system, and/or by a third party provider.

As mentioned above, the charitable donation plans offered to a donor or contributor may be based on alms-giving practices of one or more religions. Accordingly, a plurality of charitable donation plans may be offered to potential contributors, each corresponding to a particular charitable-giving practice or custom. For example, Muslims who adhere to the alms-giving practice of Zakat may be offered several different choices regarding calculations and payment because the amount of Zakat to be paid by an individual depends on the amount of wealth and the type of assets the individual possesses. In particular, in accordance with Islam, the amount of Zakat to be paid on capital assets (money) is 2.5%. Zakat is also payable on agricultural goods, precious metals, minerals and livestock at a rate varying from 2.5% to 20% depending on the type of goods. In addition, Zakat is only payable on assets continuously owned over one lunar year that are in excess of the nisab, which is a minimum monetary value. The nisab is calculated after adding the cash value of zakatable assets (such as gold, silver, cash, stocks, merchandise for business, livestock, and the like). Personal assets such as clothing, household furniture, and one residence are not considered to be zakatable assets. Thus, calculating Zakat can be a confusing and time consuming process, involving different calculations for different assets over time. Accordingly, a bank customer wishing to pay Zakat may be provided with computer algorithms or software by his bank (a Contributor Bank) for use to perform calculations in accordance with the financial situation of that bank customer (potential contributor). The calculation for other types of alms-giving practices may be more straightforward, but may also involve decisions that need to be made by the contributor. Thus, potential contributors may be provided with a menu of options, and may be permitted to modify and/or select one or more variables associated with one or more of the donation plans in order to meet his or her charitable obligations.

As mentioned above, a charitable donation application program may be provided to donors to help them to calculate estimated donation amounts, and/or to select a charitable giving plan, and/or to select registered and/or accredited recipients (charitable organizations) by using a mobile device or other electronic device. In addition, such charitable donation programs may be configured to remind the donors concerning obligations, for example, that it is time to pay their Zakat obligation (or that it is almost time to pay a Zakat obligation). Such reminder messages may be generated by a donor's mobile device or desktop computer, for example, based on data input by the donor and then the reminder displayed on a display screen at the appropriate time and/or date. In some implementations, such reminder messages are generated by one or more of a contributor financial institution, a broker computer system, a recipient financial institution, or by a third party, and then the reminder transmitted to a donor device via email, SMS, and/or push notifications for display to a consumer. In some embodiments, depending on the type of electronic device being used by the donor, the charitable giving reminders may be audible and/or visual notifications.

Figure 5:
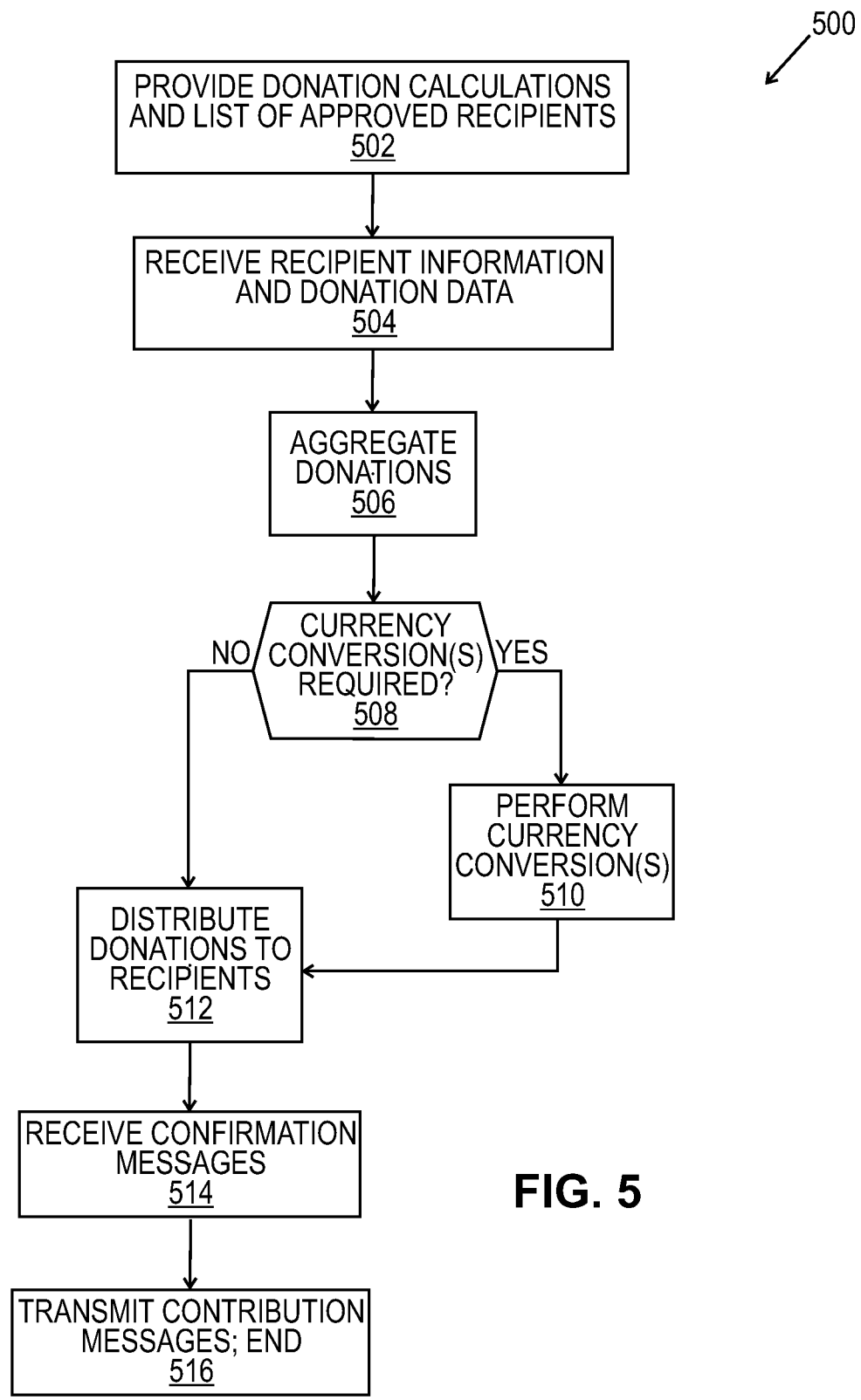
FIG. 5 is a flow chart illustrating a donation distribution process according to an embodiment of the inventions.

FIG. 5 is a flow chart illustrating an alms-giving distribution process 500 according to an embodiment. A Broker Computer system 108 provides 502 donation calculators and a list of approved recipients to Contributor Banks 106A to 106N. The donation calculators may correspond to a plurality of different alms-giving plans, such as Zakat and/or tithing plans, and be provided to Contributor Banks so that their banking customers can use them to calculate donation amounts. Next, the Broker Computer system receives 504 approved recipient information and donation data associated with various alms-giving plans from a plurality of Contributor Banks. The recipient information may include, for example, the names of charitable organizations and recipient bank account data. The donation data may include, for example, data concerning contributor's bank accounts and the associated amounts of funds (donation amounts) to be transferred and/or donated to approved recipients through accounts at the recipient banks. The Broker Computer system then aggregates 506 the donation information from the Contributor Banks, for example, based on the recipient information (for example, via recipient bank data). Next, in step 508, if needed, the Broker Computer system performs currency conversions 510 and then distributes 512 donations to recipient bank accounts. As mentioned above, the Broker Computer system strives to minimize currency conversion costs by converting aggregated currency amounts when possible and/or appropriate. For example, in some embodiments, the Broker Computer system may maintain multiple different currency accounts or currency buckets (wherein each account or bucket is associated with a different type of currency) for use to expedite and/or to maximize donation amounts received by approved recipients. Thus, if contributor A resides in country A and thus has currency code X and contributor B resides in country B and has currency code Y, but each of these contributors is sending a donation to an approved recipient having the opposite currency code, then the Broker Computer system may perform a swap between the donations of contributor A and contributor B of all or a portion of the donated amounts by using a first account having funds of currency code X and a second account with funds of currency code Y. Use of such accounts maintained by the Broker Computer System in this manner avoids incurring currency conversion costs, and thus maximizes the benefit to the accredited recipients while at the same time transferring the same or approximately the same conversion value as desired by the contributors.

Referring again to FIG. 5, the Broker Computer system next receives 514 confirmation messages from the recipient banks, and then generates and transmits 516 contribution messages to the contributor banks. The process then ends.

Figure 6:
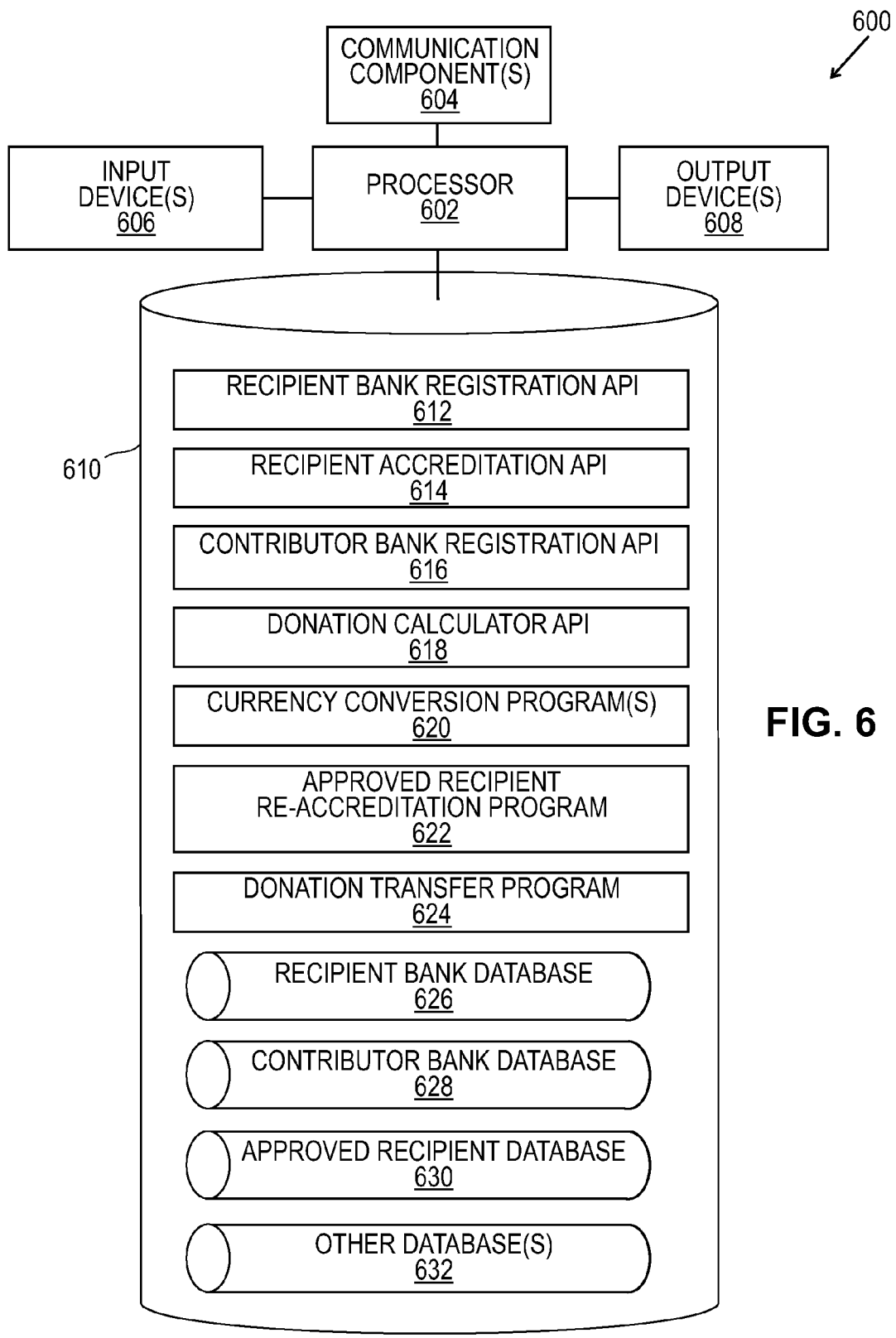
FIG. 6 is a block diagram of an embodiment of a Broker Computer system according to embodiments of the invention.

FIG. 6 is a block diagram of an embodiment of a Broker Computer system 600 according to some embodiments. The Broker Computer system may be conventional in its hardware aspects but may be controlled by software to cause it to operate in accordance with aspects of the methods presented herein. In particular, the Broker Computer system 600 may include a processor 602 operatively coupled to one or more communication component(s) 604, input device(s) 606, output device(s) 608, and a storage device 610.

The processor 602 may constitute one or more conventional processors. Processor 602 operates to execute processor-executable steps, contained in program instructions described herein, so as to control the Broker Computer system 600 to provide desired functionality.

Communication component 604 may be used to facilitate communication with, for example, other devices. Communication device 604 may also, for example, have capabilities for engaging in data communications over conventional computer-to-computer data networks, and/or for wireless communications. Such data communications may be in digital form and/or in analog form.

Input device 606 may comprise one or more of any type of peripheral device typically used to input data into a computer or computer system. For example, the input device 606 may include a keyboard and a mouse and/or a touchpad that may be used, for example, by a systems engineer or other personnel authorized to, for example, perform computer system maintenance, updates or other tasks. The output device 608 may comprise, for example, a display screen and/or a printer or other type of output component.

Storage device 610 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as "flash" memory devices. Any one or more of the listed storage devices may be referred to as a "memory", "storage", a "storage medium" or a "computer-readable medium".

The non-transitory storage device 610 stores one or more programs for controlling processor 602. In some implementations, the programs comprise program instructions (non-transitory software code) that contain processor-executable process steps of the Broker Computer system 600, including, in some cases, process steps that constitute processes provided in accordance with principles of the processes presented herein.

The programs may include a recipient bank registration application program interface (API) 612 that manages the processing of recipient bank applications, and a recipient accreditation API 614 that manages the screening and/or vetting process of potential recipients (such as charitable organizations). The recipient accreditation API 614 may handle initial screening of a potential recipient by utilizing predetermined rules and regulations and then, in some implementations, contact government and/or law enforcement entities in various countries (which may depend upon the location and/or residence of the recipient bank and/or the potential recipient) for final screening. Once a potential recipient has passed the vetting process, then the recipient accreditation API may operate to store that recipient's information in the approved recipient database, and place that recipient on a list of approved recipients for purposes of receiving charitable donations.

Referring again to FIG. 6, the programs may also include a contributor bank registration API 416 that manages the processing of contributor bank applications for use of the Broker Computer system. As mentioned above, in some embodiments, contributor banks or financial institutions enter into an agreement with an entity that operates the Broker Computer system 600 to obtain access to Broker Computer system software and/or middleware and/or alms-giving support services for handling charitable donation plans. Accordingly, a donation calculator API 618 may be included that provides one or more algorithms to contributor banks for use by bank customers (potential donors or contributors) to calculate the amount of money to contribute based on various types of donation plans. For example, if a bank customer wishes to pay Zakat, then he would utilize a Zakat donation calculator that would request input of information concerning the contributor's bank accounts, possessions and/or assets such as vacation homes, automobiles, stock and/or bond investments along with valuations, and possibly other similar information. The donation data may also include any modifications that a particular contributor wished to make to certain variables associated with Zakat, for example, the contributor may designate a 3% Zakat rate to be paid on money in a particular bank account, instead of the default 2.5% rate. Thus, in some embodiments the Broker Computer system may maintain a database containing a plurality of alms-giving algorithms that can be accessed by the Contributor Banks 106A-106N for use by donors (bank customers) to calculate donation amounts.

Also stored in the storage device 610 may be a currency conversion program(s) 620, and an approved recipient re-accreditation program 622 for use to periodically re-validate approved recipients to ensure that the approved recipients have remained in good standing. In addition, a donation transfer program 624 may be stored in the storage device 610, for use by the Broker Computer system to transfer funds from a plurality of contributor bank accounts to a plurality of recipient bank accounts. For example, the donation transfer program 624 may include one or more batch processes for aggregating donations of a particular day (or some other time period) from a plurality of contributor banks in accordance with, for example, one or more approved recipients selected by contributors, and then transferring the aggregated amounts according to a predetermined schedule or schedules. In addition, the donation transfer program may include one or more batch processes for aggregating donations from a plurality of contributor banks that require translation or conversion from one type of currency to another type of currency so that conversion fees and/or exchange rate fees can be avoided or minimized. In addition, the donation transfer program may include a process or processes for maintaining a plurality of currency accounts or currency buckets, wherein each such currency account corresponds to a particular currency type (such as US Dollars, Euros, Canadian Dollars, Chinese Yuan, Japanese Yen and the like) that may be used to conduct currency swaps between donations (instead of currency conversions with associated conversion fees) to maximize the benefit to approved recipients. The application programs of the personalization server computer 600, as described above, may be combined in some embodiments, as convenient, into one, two or more application programs. Moreover, the storage device 610 may store other programs or applications, such as one or more operating systems, device drivers, database management software, web hosting software, and the like.

In addition, the storage device 610 may include one or more databases that are maintained by the entity operating the Broker Computer system on the storage device 610. In particular, pursuant to some embodiments, the processes for calculating charitable donations for contributors and for distributing the charitable donations to approved charitable organizations may be performed using a number of different databases. For example, the databases may be utilized and/or consulted to generate a list of approved recipients for transmission to one or contributor banks for presentation to bank customers for making selections. Thus, referring to FIG. 6, databases stored in the storage device 610 may include a recipient bank database 626, a contributor bank database 628, an approved recipient database 630, and other database(s) 632.

In some embodiments, the Broker Computer system 108 may also operate to validate and/or journal all communications with Contributor financial institutions (FIs) 106A to 106N and/or with recipient FIs 110A to 110N. In addition, as described above, the Broker Computer system may maintain a number of currency buckets to accommodate all possible contributor bank and/or recipient bank currency codes, and/or (as mentioned above) may perform all necessary currency conversions between any particular contributor bank account and recipient bank account. Moreover, the Broker Computer system may operate to consolidate contributions (transfers of money) from each contributor bank to the recipient banks to minimize transfer fees by minimizing the number of payments (which reduces transaction fees). Having a higher bulk amount of donations also results in minimizing any currency conversion fees.

It should be understood that the disclosed systems, apparatus and methods can be modified for use in other environments, for example, for use business environments or for use in government environments. For example, a business may collect a percentage of wages from employees to donate to charities according to various alms-giving plans selected by the employees. A government may collect a tax from citizens, for example, wherein the proceeds are distributed to one or more charitable organizations that may be selected by each citizen (or chosen by the government).

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for distributing charitable donation amounts for a plurality of contributors comprising:
   receiving, by a broker computer processor of a broker computer system from a plurality of contributor financial institution (FI) computers, contributor information of a plurality of contributors, approved recipient bank account data of approved recipients selected by the plurality of contributors, and donation data, wherein the donation data comprises contributor bank account data of the plurality of contributors and associated donation amounts;
   aggregating, by the broker computer processor utilizing a batch process, the donation data into a plurality of recipient contribution amounts based on the approved recipient bank account data with a frequency determined by an entity operating the broker computer system;
   swapping, by the broker computer processor for the plurality of recipient contribution amounts, donation amounts of a first currency type from first contributors with donation amounts of a second currency type from second contributors when the approved recipients of the first contributors have an associated currency code associated with the second currency type and the approved recipients of the second contributors have a currency code associated with the first currency type; and
   distributing, by the broker computer processor, each of the recipient contribution amounts to each of a plurality of recipient FI computers associated with the approved recipient bank account data.

2. The method of claim 1, further comprising, receiving, by the broker computer processor, confirmation messages from the plurality of recipient FI computers.

3. The method of claim 2, further comprising:
   generating, by the broker computer processor, contribution messages based on the confirmation messages; and
   transmitting, by the broker computer processor, the contribution messages to the contributor FI computers.

4. The method of claim 1, further comprising:
   generating, by the broker computer processor, at least one reminder message regarding a charitable obligation; and
   transmitting, by the broker computer processor, the reminder message to at least one contributor device.

5. The method of claim 1, further comprising:
   receiving, by the broker computer processor, a recipient registration request from a potential recipient charitable organization;
   determining, by the broker computer processor, that the potential recipient charitable organization provided all required information;
   determining, by the broker computer processor, to approve the potential recipient charitable organization when the required information passes a screening process; and
   storing, by the broker computer processor, information regarding the approved recipient charitable organization in an approved recipient database.

6. The method of claim 5, further comprising transmitting, by the broker computer processor, an approval message to a recipient financial institution associated with the approved recipient charitable organization.

7. The method of claim 5, further comprising:
transmitting, by the broker computer processor to the approved recipient charitable organization, an update request;
receiving, by the broker computer processor, data from the approved recipient charitable organization; and
transmitting, by the broker computer processor to the approved recipient charitable organization, an approval message confirming approval when the data satisfies recipient accreditation rules and regulations.

8. An apparatus for distributing charitable donation amounts for a plurality of contributors, comprising:
a broker computer processor;
a communication device operably connected to the broker computer processor; and
a storage device operably connected to the broker computer processor, wherein the storage device stores instructions configured to cause the broker computer processor to:
receive, from a plurality of contributor financial institution (FI) computers, contributor information of a plurality of contributors, approved recipient bank account data of approved recipients selected by the plurality of contributors, and donation data, wherein the donation data comprises contributors bank account data and associated donation amounts;
aggregate utilizing a batch process, the donation data into a plurality of recipient contribution amounts based on the recipient bank account data with a frequency determined by an entity operating the broker computer system;
swap, for the plurality of recipient contribution amounts, donation amounts of a first currency type from first contributors with donation amounts of a second currency type from second contributors when the approved recipients of the first contributors have an associated currency code associated with the second currency type and the approved recipients of the second contributors have a currency code associated with the first currency type; and
distribute each of the recipient contribution amounts to each of a plurality of recipient FI computers associated with the approved recipient bank account data.

9. The apparatus of claim 8, wherein the storage device stores further instructions configured to cause the broker computer processor to receive a confirmation message from the recipient FI computers.

10. The apparatus of claim 9, wherein the storage device stores further instructions configured to cause the broker computer processor to:
generate contribution messages based on the confirmation message; and
transmit the contribution messages to the plurality of contributor FI computers associated with the contributors.

11. The apparatus of claim 8, wherein the storage device stores further instructions configured to cause the broker computer processor to:
generate at least one reminder message regarding a charitable obligation; and
transmit the reminder message to at least one contributor device.

12. The apparatus of claim 8, wherein the storage device stores further instructions configured to cause the broker computer processor to:
receive a recipient registration request from a potential recipient charitable organization;
determine that the potential recipient charitable organization provided all required information;
determine that the potential recipient charitable organization is an approved recipient when the required information passes a screening process; and
store information regarding the approved recipient charitable organization in an approved recipient database.

13. The apparatus of claim 12, wherein the storage device stores further instructions configured to cause the broker computer processor to transmit an approval message to a recipient financial institution associated with the approved recipient charitable organization.

14. The apparatus of claim 12, wherein the storage device stores further instructions configured to cause the broker computer processor to:
transmit an update request to the approved recipient charitable organization;
receive data from the approved recipient charitable organization; and
transmit an approval message confirming approval to the approved recipient charitable organization when the data satisfies recipient accreditation rules and regulations.

* * * * *